United States Patent [19]

Curtz

[11] Patent Number: 4,851,065
[45] Date of Patent: Jul. 25, 1989

[54] CONSTRUCTION OF HOLLOW, CONTINUOUSLY WOUND FILAMENT LOAD-BEARING STRUCTURE

[75] Inventor: William C. Curtz, Seattle, Wash.

[73] Assignee: Tyee Aircraft, Inc., Everett, Wash.

[21] Appl. No.: 937,454

[22] Filed: Dec. 1, 1986

Related U.S. Application Data

[60] Division of Ser. No. 820,908, Jan. 17, 1986, abandoned, which is a continuation of Ser. No. 440,974, Nov. 12, 1982, abandoned.

[51] Int. Cl.$^4$ ............................................. B65H 81/00
[52] U.S. Cl. .................................. 156/172; 156/173; 428/35.8; 428/36.3; 52/309.1
[58] Field of Search .................. 403/103, 357; 156/91, 156/171–173; 242/1, 3, 7.21, 7.22, 68.6; 264/103, 357; 428/36, 376; 52/309.1, 655, 720, 726, 727

[56] References Cited

U.S. PATENT DOCUMENTS

| | | | |
|---|---|---|---|
| 3,263,389 | 8/1966 | Heirich | 52/720 |
| 3,280,850 | 10/1966 | Gorcy et al. | 156/172 |
| 3,466,210 | 9/1969 | Wareham | 264/257 |
| 3,711,361 | 1/1973 | Casadevall | 156/172 |
| 3,850,722 | 11/1974 | Kreft | 156/172 |
| 4,104,095 | 8/1978 | Shaw | 156/172 |
| 4,172,175 | 10/1979 | Pearson et al. | 428/376 |
| 4,236,386 | 12/1980 | Yates et al. | 464/181 |
| 4,238,539 | 12/1980 | Yates et al. | 428/36 |
| 4,238,540 | 12/1980 | Yates et al. | 428/36 |
| 4,260,332 | 4/1981 | Weingart et al. | 416/226 |
| 4,265,951 | 5/1981 | Yates et al. | 428/36 |
| 4,289,557 | 9/1981 | Stanwood et al. | 156/173 |
| 4,372,500 | 2/1983 | Saraisky | 242/68.6 |
| 4,426,413 | 1/1984 | Fentress | 428/36 |
| 4,469,730 | 9/1984 | Burhams | 156/173 |
| 4,495,231 | 1/1985 | Laskaris et al. | 428/376 |

FOREIGN PATENT DOCUMENTS

| | | | |
|---|---|---|---|
| 2930652 | 11/1980 | Fed. Rep. of Germany | 242/68.6 |
| 144971 | 12/1978 | Japan | 264/257 |
| 62119 | 5/1981 | Japan | 428/36 |
| 50356 | 3/1983 | Japan | 156/91 |

OTHER PUBLICATIONS

G. A. Fisher, IBM Technical Disclosure Bulletin, "Electric Motor Armature", Nov. 1963, vol. 6, No. 6, pp. 50, 51.

Primary Examiner—David A. Scherbel
Assistant Examiner—Richard E. Chilcot, Jr.
Attorney, Agent, or Firm—Christensen, O'Connor, Johnson & Kindness

[57] ABSTRACT

Hollow continuously wound filament integral structures having integral filament and resin interleafs, integral sleeves, and integral end fittings to transfer all loads, their method, and apparatus of manufacture, all center on the making and use of the filament and resin interleafs. In a preferred embodiment each interleaf has spaced leafs, arranged parallel, i.e. at a zero angle, to the longitudinal axis of each hollow continuously wound filament integral structure, of a length to extend from respective ends of the structure, over and well beyond the respective turnaround zones of the continuous filament and resin windings, so all types of loads will be fully transferred. Also each interleaf has circumferential filament and resin root wraps, wound at ninety degrees to the longitudinal axis of each hollow continuously wound filament integral structure, holding the spaced leafs in place and maintaining a circumferential strength to prevent harmful radial expansion of any integrally wound filaments and resin during their transfer of loads, to thereby keep the integral end fittings in place when they are transferring loads.

4 Claims, 7 Drawing Sheets

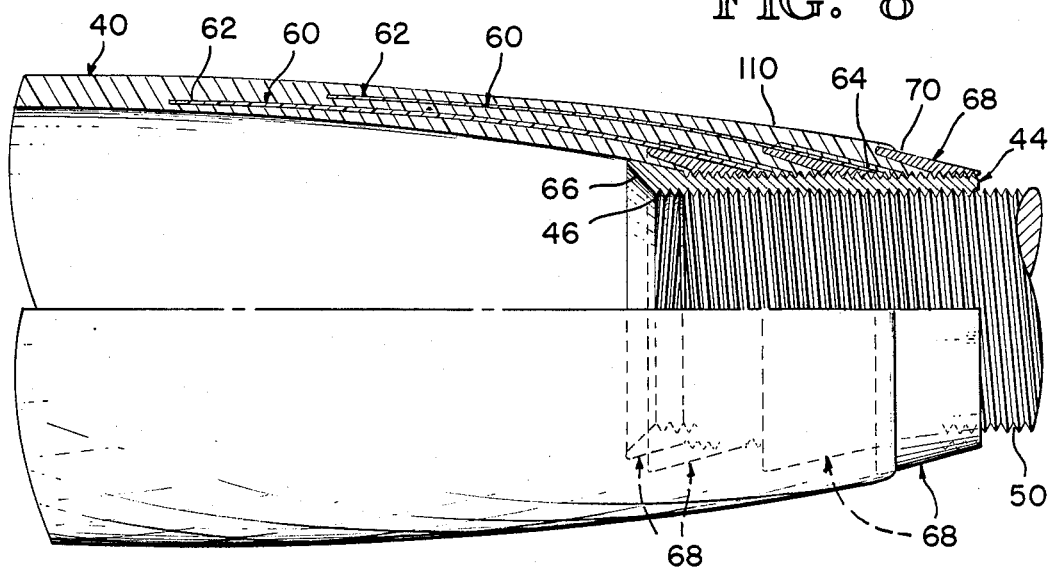
FIG. 8
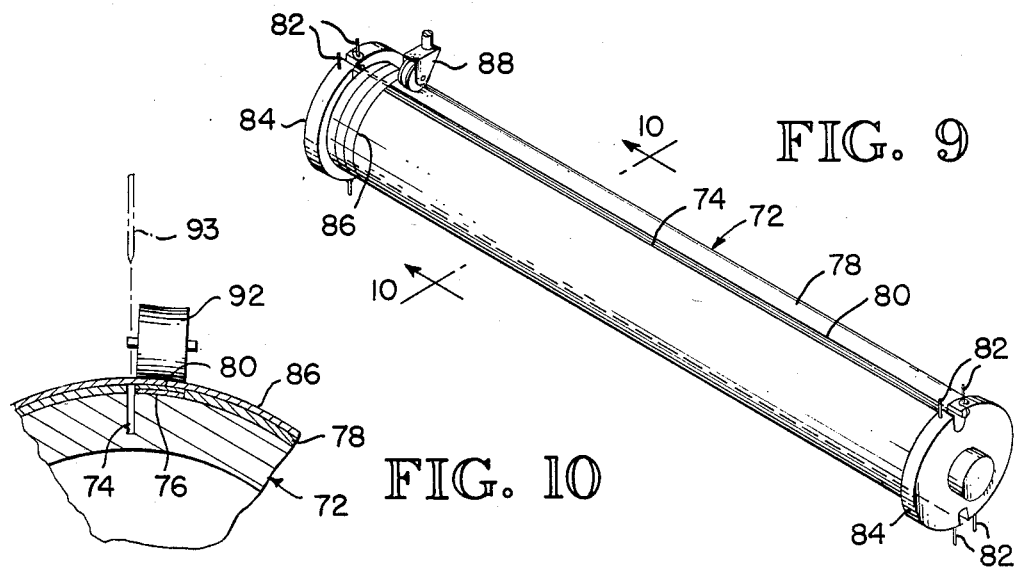
FIG. 9
FIG. 10
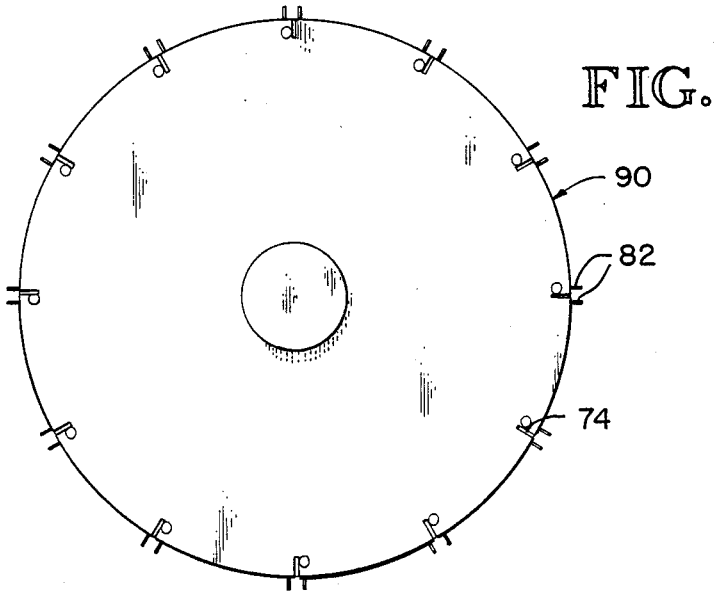
FIG. 11
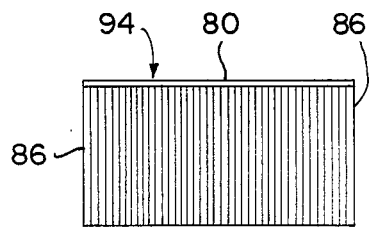
FIG. 12

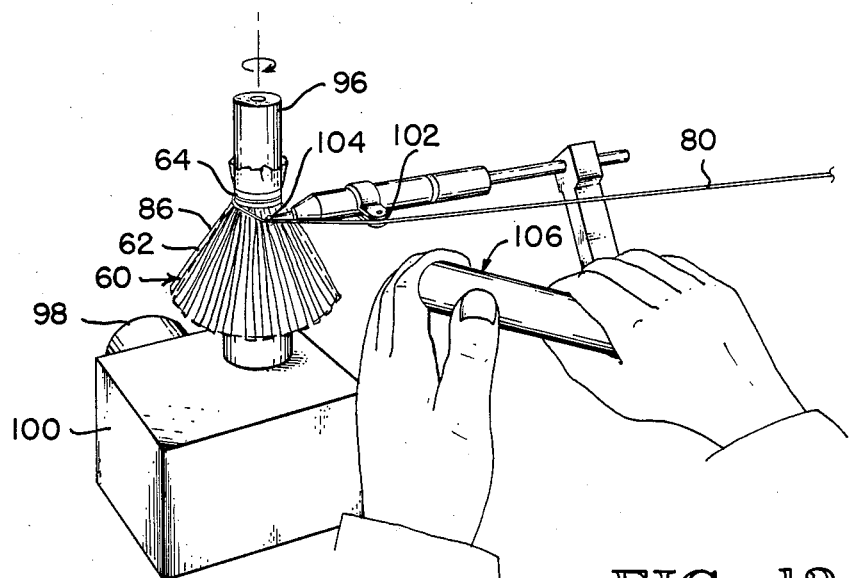
FIG. 13
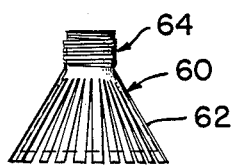
FIG. 14
FIG. 15    FIG. 16    FIG. 17
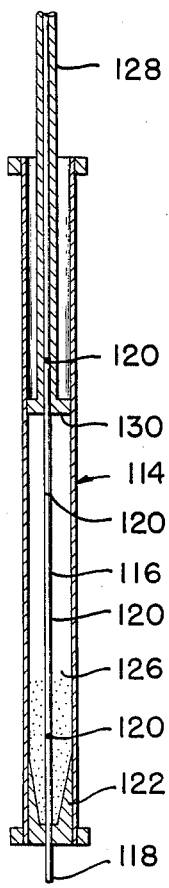 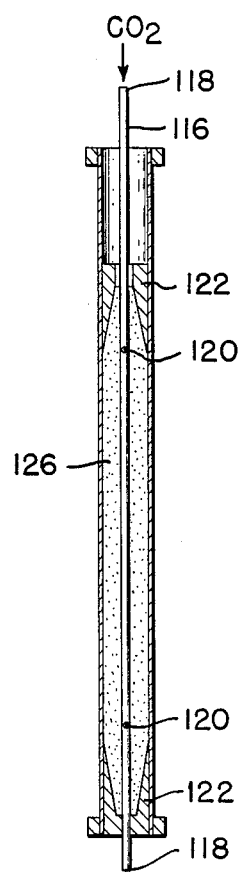 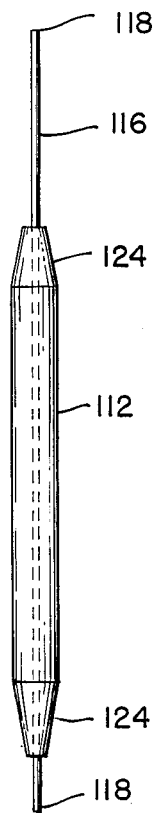

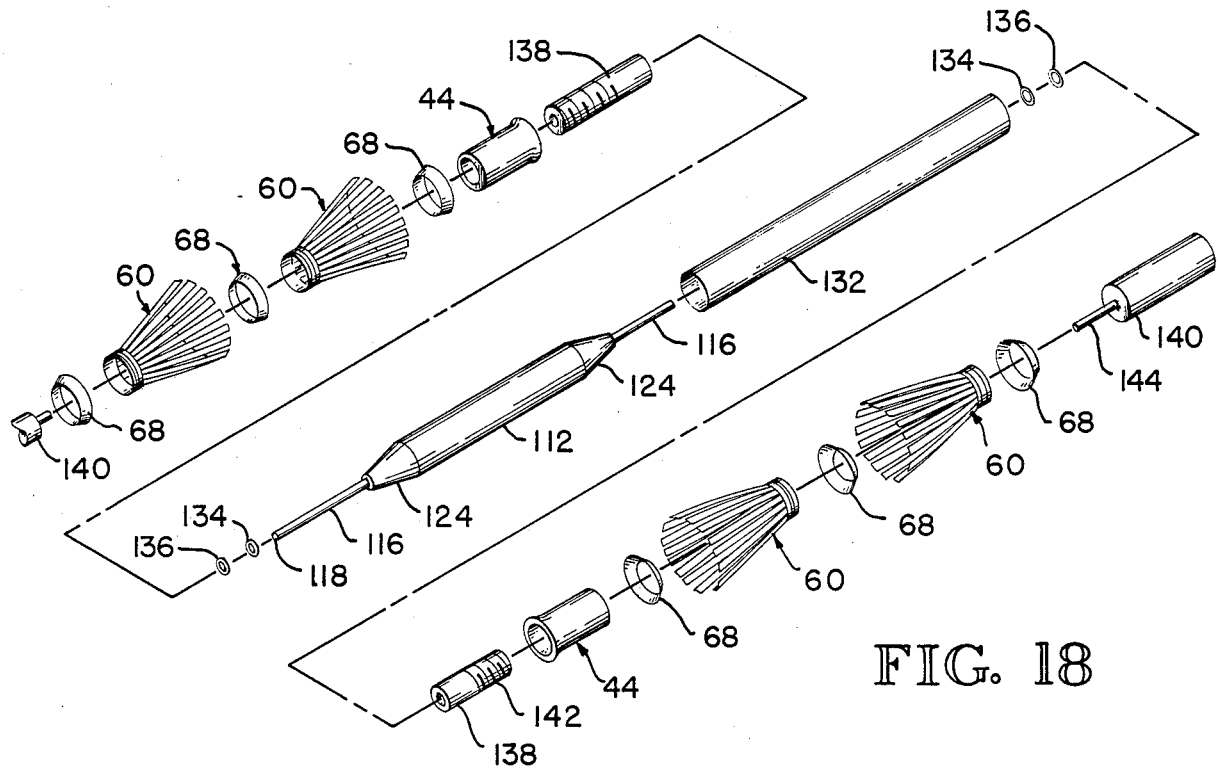
FIG. 18
FIG. 19
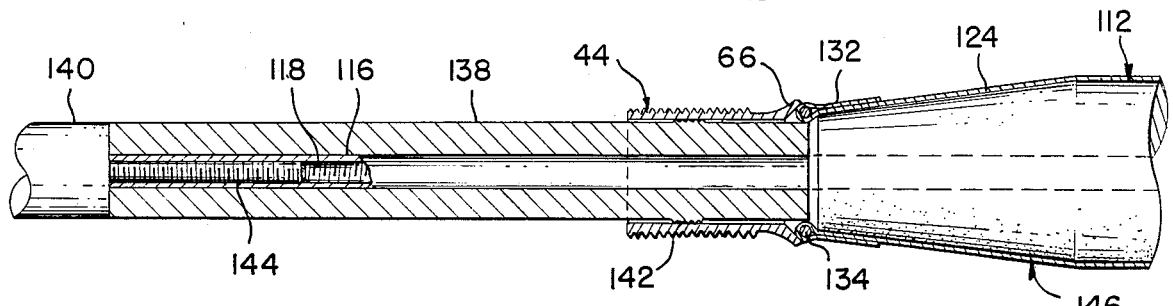
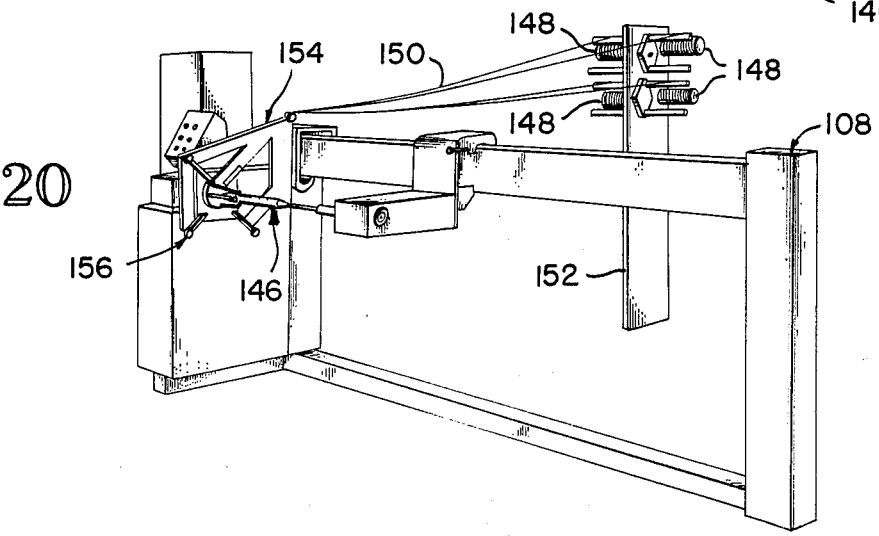
FIG. 20

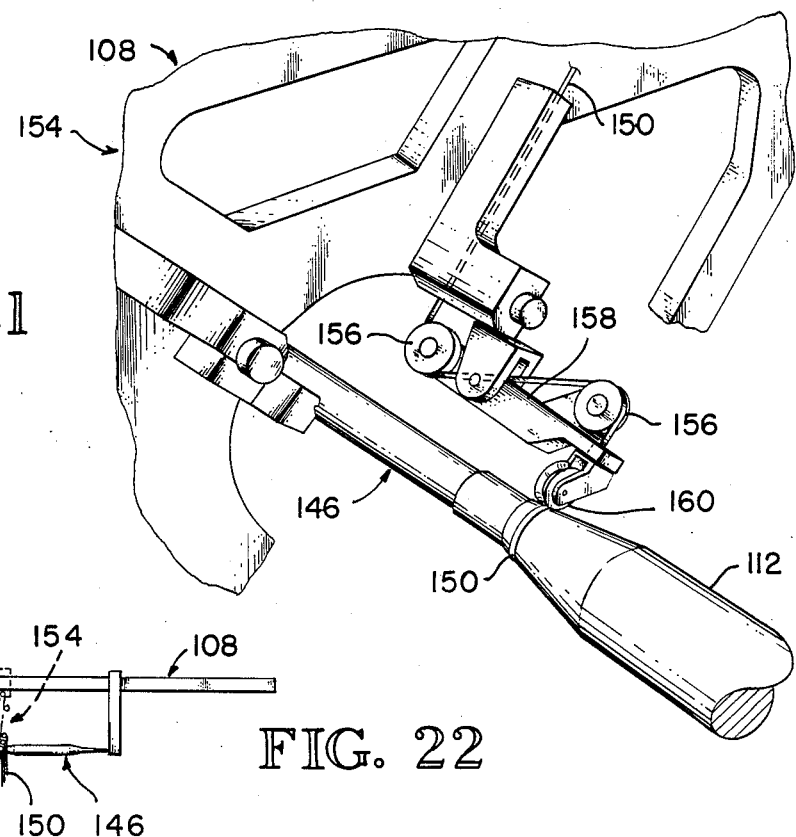
FIG. 21
FIG. 22
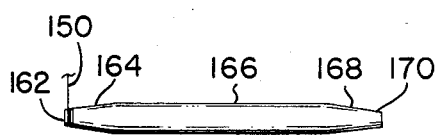
FIG. 23A
FIG. 23B
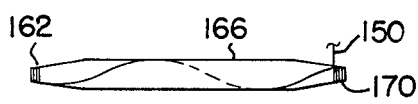
FIG. 23C
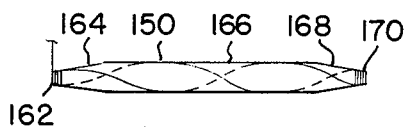
FIG. 23D
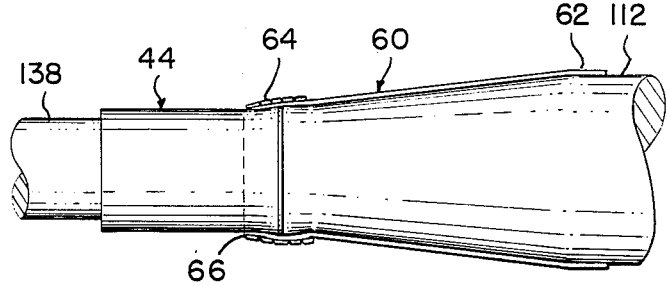
FIG. 24
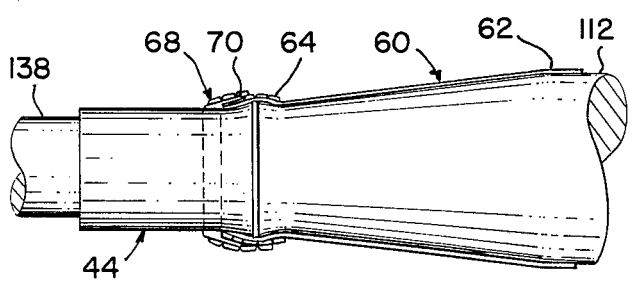
FIG. 25

FIG. 26 FIG. 27
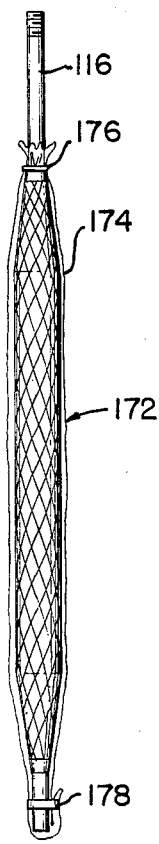
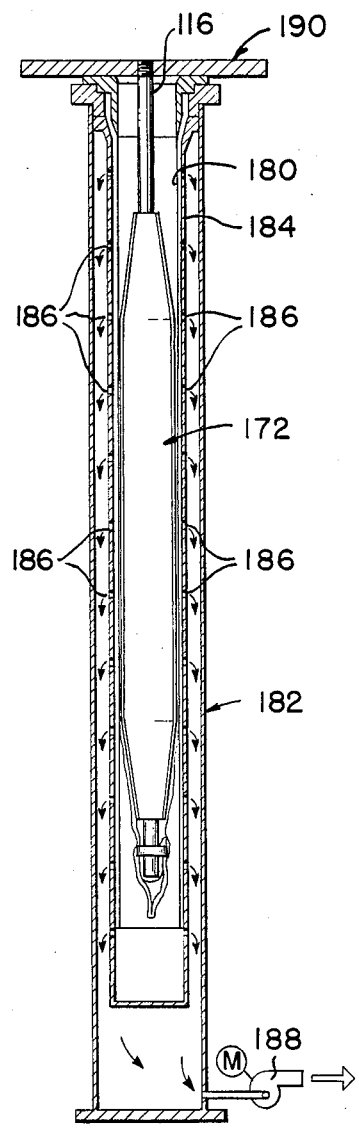
FIG. 29
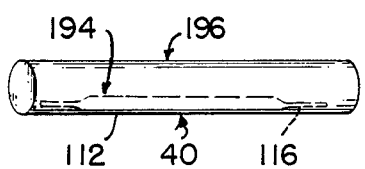
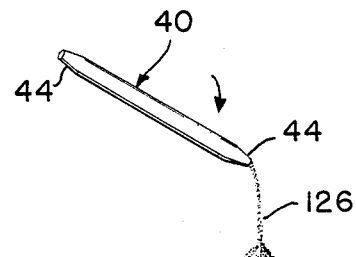
FIG. 30
FIG. 28
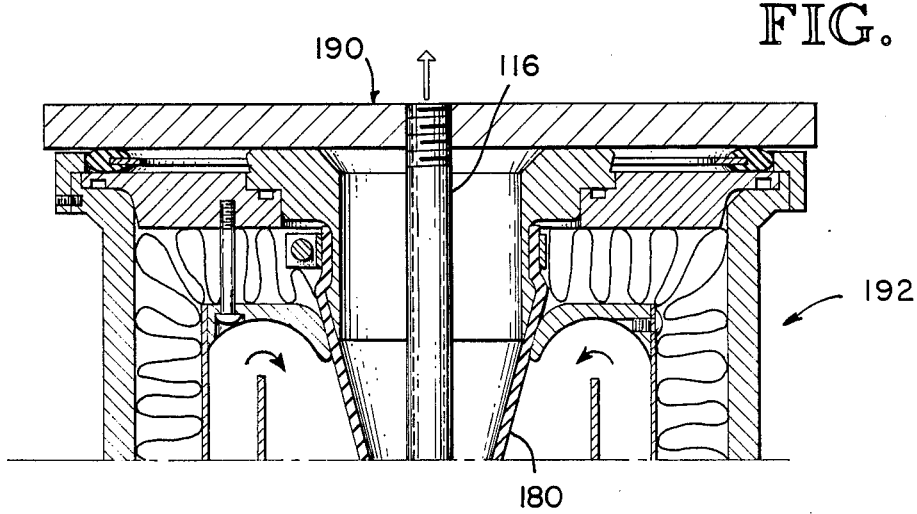

CONSTRUCTION OF HOLLOW, CONTINUOUSLY WOUND FILAMENT LOAD-BEARING STRUCTURE

This application is a divisional application based on prior copending application Ser. No. 820,908, filed Janu. 17, 1986, now abandoned, which in turn is a continuation of application Ser. No. 440,974, filed Nov. 12, 1982, now abandoned.

BACKGROUND OF THE INVENTION

Hollow filament wound structures, which exhibit advantages over metal structures, such as being lighter in weight, more resistant to corrosion, stronger, and more inert, have been manufactured for several years such as:

the tubular fiber reinforced composite shaft with metallic connector sleeves mounted by a polygon surface interlock, as disclosed in U.S. Pat. No. 4,236,386, in 1980;

the tubular fiber reinforced composite shaft with metallic connector sleeves mounted by a knurl interlock, as disclosed in U.S. Pat. No. 4,238,539, in 1980;

the tubular fiber reinforced composite shaft with metallic connector sleeves mounted by a connector ring interlock, as disclosed in U.S. Pat. No. 4,238,540, in 1980;

the hollow filament wound spar structure having integral fitting for rotational hub mounting, as disclosed in U.S. Pat. No. 4,260,332, in 1981;

the tubular fiber reinforced composite shaft with metallic connector sleeves mounted by longitudinal groove interlocks, as disclosed in U.S. Pat. No. 4,265,951, in 1981; and the wound graphite epoxy or fiberglass driveshaft joined to a metal end member as disclosed in U.S. Pat. No. 4,289,557, source in 1981.

As stated in prior patents, U.S. Pat. Nos. 4,236,386 and 4,238,539, previous proposals for mounting sleeves, i.e. end fittings, by employing adhesives or by wrapping the filament bundles around circumferential grooves on the end fitting periphery, could not be relied upon to provide a connection of the requisite strength and durability. Then the disclosures of these patents, like the other patents, illustrated and described how end fittings were positioned in the ends of hollow continuously wound filament integral structures for the transmission of torque loads.

In these prior patents there were not any direct discussions of how hollow continuously wound filament integral structures with end fittings could sustain large tension or compression loads as well as sustaining large torque loads, Moreover, there were no direct discussions of how hollow continuously wound filament integral structures could be reduced in diameter at their ends and integrally receive end fittings, which under large tension, compression, or torque loads, would remain securely in place within the hollow continuously wound filament integral structure.

There remained a need for creating hollow continuously wound filament structures having integral end fittings firmly held in place under all types of severe loads, wherein: the wound structure was completed in one overall winding operation; the diameter at the respective ends of the wound structure did not become greater and preferably remained smaller during the winding operation; and the loads carried through the respective turnaround zones of the windings were, whenever necessary, equal to the maximum loads capable of being transmitted throughout the remaining portions of the hollow continuously wound filament integral structure.

SUMMARY OF THE INVENTION

Hollow continuously wound filament integral structures, having integral filament and resin interleafs, integral sleeves, and integral end fittings are manufactured in many embodiments to transfer all types of loads throughout an extensive range of load requirements. These structures do not have mechanical fasteners, later relied upon, to hold their components together, after the one overall winding operation is completed. The filament and resin windings may be selected to avoid galvanic and electrical problems. The strengths of the filament and resin windings directed under and over and around the integral filament and resin interleafs in conjunction with the strengths of the interleafs, insures there will be sufficient multiple plane or layer bonding to avoid peeling and to fully transfer maximum loads of all types, throughout the entire length of these hollow continuously wound filament integral structures. High production is obtained at comparatively low tooling costs, without any substantial loss of material, and with many specific product requirements being quickly met by comparatively easily accomplished production method changes. The production apparatus and methods insure the availability of many selective sizes of well balanced efficient hollow continuously wound filament integral structures, each having their specific interleafs of a preselected number and of a preselected arrangement, to overcome any strength deficiencies, otherwise to be located in the respective turnaround zones of the respective continuously wound filament and resin. The integral interleafs are readily and selectably made in various sizes to respectively assist in carrying various types of loads. The integral end fittings and integral sleeves, often threaded, are readily and selectably made in various sizes to respectively carry the various types of loads. The overall continuous filament and resin windings are selected to create balanced layers of respective angle windings to withstand specified loads of all types. Therefore there are now available hollow continuously wound filament integral structures which may be used in many more ways to transmit loads of all types.

DRAWINGS OF THE PREFERRED EMBODIMENTS

The hollow continuously wound filament integral structures having integral filament and resin interleafs, integral sleeves, and integral end fittings to transfer all types of loads, and their use, and their method and apparatus of manufacture, are illustrated in the drawings, wherein:

FIGS. 1 through 5, illustrate where and how the hollow continuously wound filament integral structures are used in the framing of the fuselage of an aircraft, with FIG. 1 showing the aircraft, FIG. 2 being a cross section of the aircraft, FIG. 3 being a partial longitudinal section, FIG. 4 showing in part a longitudinal deck supporting beam, and FIG. 5 showing in part another deck supporting beam;

FIGS. 6, 7, and 8 illustrate how hollow continuously wound filament integral structure, is arranged to carry loads in the places shown in FIGS. 1 through 5, with FIG. 6 showing how aircraft threaded connectors are secured at each end into the end fittings of this structure, FIG. 7 being an exploded view, with the liberty taken of separating the components without destroying the windings of the hollow continuously wound filament body, which, as shown in FIGS. 6 and 8 integrally winds all the components in place except for the later added aircraft connectors or other connectors, such as used in the aircraft installations, as shown in FIGS. 1 through 5, and FIG. 8 illustrating by a partial end section with portions removed to show in section the integral placement of the interleafs of filament and resin, with the end fittings, the outer sleeves, and the layers of continuously wound filament and resin;

FIGS. 9 through 14, illustrate how the interleafs of filament and resin are made, with FIG. 9 showing one embodiment of a smaller diameter mandrel having two longitudinal slots which determine where circumferential windings of filament and resin are cut, after first being bonded to a longitudinal root wrap earlier placed adjacent each slot, FIG. 10 depicting in a partial enlarged cross section of this mandrel the relative position of a longitudinal slot, a heating tool and a cutting tool, an adjacent location of a narrow length of double backed tape, the release barrier film positioned about the mandrel and kept clear of the slot entrances and the double back tapes which each receive a root wrap before the illustrated circumferential windings of filament and resin are started for their later heat bonding of the root wrap and windings, FIG. 11 showing a larger diameter mandrel having more longitudinal slots so many more interleafs may be made during one overall winding, FIG. 12 showing a selected planar arrangement of leafs and a root wrap derived from operation of the mandrel of FIG. 9, following longitudinal cuttings and selected transverse cuttings, FIG. 13, illustrating winding of the planar arrangements and root wraps to create a selected embodiment of an interleaf shown in FIG. 14, having multiple layers and appearing as a grass skirt;

FIGS. 15, 16, and 17, illustrate a method of making a mandrel, when sand is selected as the basic material, FIG. 15 showing the utilization of a split mold having a centered hollow guide rod, over which shaft supporting a sand compacter is slidably and turnably guided, FIG. 16 indicates the insertion of an end forming sleeve to complete the compaction and forming of the sand which was first moistened with a sodium silicate solution, and then $CO_2$ is rejected down through the centered hollow guide rod and out through its transverse holes to react with the sodium silicate solution forming the sand mandrel shown in FIG. 17;

FIGS. 18 and 19 illustrate how the mandrel and all other parts are assembled for rotatable mounting in a filament and resin winding machine, with FIG. 18 in an exploded view showing how the mandrel receives a sealable release barrier film, originally being in tube form, circular seals are installed, chucking end components are assembled and threaded to the centered hollow guide rod, end fittings are fitted over the chucking components, and selected numbers of outer sleeves and interleafs are fitted over the end fittings, and FIG. 19 is a partial longitudinal sectional view, showing how the circular seals are installed to protect the mandrel and chucking components from the later resin flows of the filament and resin during the curing cycle;

FIGS. 20 through 22, illustrate how a filament and resin winding machine receives the mandrel assembly shown in FIGS. 18 and 19, with FIG. 20 being an overall view, FIG. 21 being an enlarged view indicating a castered wheel applying the filament and resin to the mandrel while positioned on a pivotal support which insures the tensioning of the filament and resin supply source is utilized to hold the castered wheel in contact with the mandrel, and FIG. 22 being a partial schematic view to indicate how the support member holding the four pivotal supports with their respective guide and castered wheels pivot at each turnaround dwell location to create a better distribution of the filament and resin windings;

FIGS. 23A through 23D schematically illustrate the commencement of the windings of filament and resin, with FIG. 23A showing dwell windings being started, FIG. 23B indicating an across the mandrel winding, FIG. 23C showing the dwell windings at the opposite end of the mandrel at the turnaround zone, FIG. 23D showing the return across the mandrel winding at the starting end of the mandrel with the dwell windings being undertaken again at this turnaround zone;

FIGS. 24 and 25 are partial side views with many portions removed to illustrate in FIG. 24, the placement of the first interleaf at this mandrel end, and in FIG. 25, the placement of the second interleaf at this mandrel end;

FIG. 26 is a side view of the uncured hollow continuously wound filament integral structure after removal from the filament and resin winding machine and after being covered with a sealable release film tube which is sealed at both ends;

FIG. 27 is a sectional view of a vacuum assembly used to expand a resilient sock into which the covered uncured hollow continuously wound filament integral structure is placed, to be subsequently tightly surrounded by the resilient sock when the vacuum ceases;

FIG. 28 is a partial outside view of an autoclave with portions removed at the top to indicate the continued support of the hollow continuously wound filament integral structure by using the centered hollow guide rod during its curing in the autoclave;

FIG. 29 is a cross sectional view of a tubular water soaking chamber into which the cured continuously wound filament integral structure and its mandrel has been placed after the removal of the centered hollow guide rod; and FIG. 30 is a view of the cured continuously wound filament integral structure with the soaked sand, freed of the binder, being removed to complete the manufacture.

DESCRIPTION OF THE PREFERRED EMBODIMENTS

Figure 1:
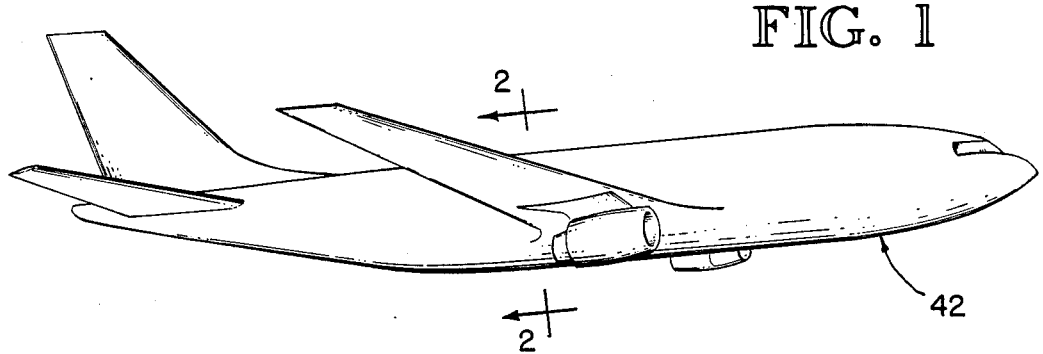
Figure 2:
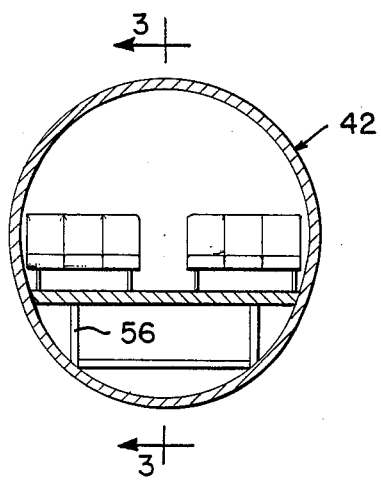
Figure 3:
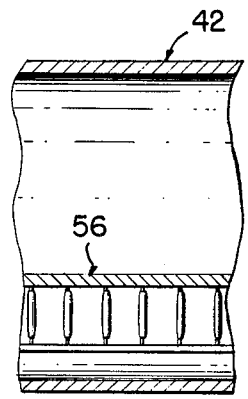
Figure 4:
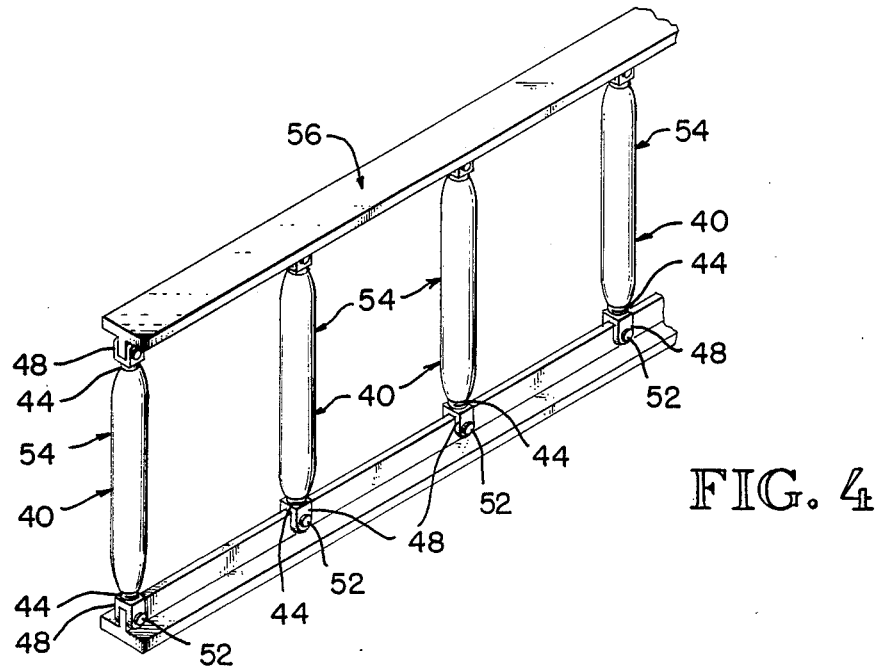

Utilizing the Best Load Transferring Capabilities of Wound Filament and Resin to Tailor by Design Many Hollow Continuously Wound Filament Integral Structures Created by Using Only One Overall Filament and Resin Winding Operation As illustrated and indicated in prior patents such as those patents referred to in the background of this invention, and as shown in FIGS. 1 through 7 of this application, there are installations in aircraft, spacecraft, and other vehicles, where fiber reinforced composite products, herein specifically referred to as hollow continuously wound filament integral structures, are used, or could be designed to be used, because they exhibit advantages over metallic parts, being lighter in weight, more resistant to corrosion, stronger, and more inert.

The hollow continuously wound filament integral structures created by utilizing just one overall filament and resin winding in the method, inclusive of the related apparatus, as illustrated and described herein, in addition to the previously noted advantages: do not require the use of mechanical fasteners after they are integrally wound, beyond generally providing internal threads in the end fittings for the securement of other fittings upon installations in vehicles; do not establish the source of any galvanic or other electrical faults; do not require high cost tooling; do not involve any appreciable loss of the source materials such as the high cost filament and resin pre pregnated filament tape, also known as filament tow; do not interfere with any high production precedures; and do not present any unforeseen structural failures such as caused by peeling, because each hollow continuously wound filament integral structure is tailored by design to successfully meet all of the specifications pertaining to a specific filament and resin wound product having end fittings integrally wound therein.

The Interleafs are the Load Carrying and Bonding Components Integrally Wound in the Hollow Continuously Wound Filament Integral Structures Which Underlie the Successful Tailoring by Design of These Structures When hollow continuously wound filament integral structures with integral end fittings are to be wound during one overall winding operation, there has always been a necessity to try to determine what strength loss may later be expected in regard to the windings occurring in the turnaround zone. The filament and resin, i.e. meaning the filaments bearing a non-hardened resinous material, i.e. an uncured thermosetting resin, being wound in the turnaround zone are wrapped at such angles to the longitudinal axis of the hollow structure being formed, that their ability to continue to participate in the transmission of axial loads is critically diminished. Moreover, even though the filament and resin are circumferentially wound during the dwell times, there also remained a necessity to try to determine what strength could be expected in circumferentially holding an end fitting in place.

Therefore to be assured of what axial loads could be transmitted and that integral end fittings would not pull out of the hollow continuously wound filament structure, interleafs are tailored to meet the overall tailored design of the hollow continuously wound filament integral structures. They are integrally used in such structures in selectable multiple numbers and various embodiments. The end objective of each overall tailored design is to create a hollow continuously wound filament structure, which if strength tested would break well above its designed load requirements and break in the middle of its longitudinal length.

The interleafs have spaced, initially parallel leafs of a length to extend over and well beyond the turnaround zone of the filament and resin windings. Also each interleaf has a root wrap which extends around the ends of the leafs to hold them in place. Each overall root wrap may comprise several wrappings to create the circumferential strength necessary to keep the end fittings in place. The number of leafs in each interleaf and the number of interleafs nestled together are determined by axial loads which are to be carried through turnaround zone essentially by the interleafs.

The collective cross sectional areas of the filaments, adjusted downwardly in respect to the percentage of resin content are utilized with the manufacturers' strength specifications to determine both the capability of the collective leafs to transmit tension or compression, and the capability of the collective root wraps to withstand tension and thereby compressively retain end fittings in place.

At all times there must be sufficient bonding areas of the leafs and root wraps so the bonding strengths will remain high enough to avoid peeling. Then the tension or compression loads will be thoroughly transmitted through and by the tailor designed hollow continuously wound filament integral structures.

End Fittings and Outer Sleeves, i.e. End Bolts or Inserts and Nuts

The hollow continuously wound filament integral structures have end fittings which are preformed from materials that will meet the specifications of an overall installation. Some strong plastics, metals, and combinations thereof may be used in the end fittings. In the illustrations and description metal end fittings are disclosed. To meet the most universal demand, these end fittings have inside threads. Because of their use and placement, the end fittings are also considered as serving as rod ends or inserts.

When interleafs are considered, the end fittings have outside threads to receive outer sleeves which are also considered as serving as nuts, and they have inside threads. Both the end fittings and the outer sleeves have flared ends which are cooperatively used in positioning the respective root wraps of the interleafs. The flaring is limited in the final diameter and enroute it is gradual or tapered so the leafs of the interleafs and the filament and resin windings in passing over the flaring are not required to excessively change their direction, which otherwise would cause a substantial reduction in their axial load carrying capabilities.

Installations and Uses of the Hollow Continuously Wound Filament Integral Structures The hollow continuously wound filament integral structures 40 have many uses such as the aircraft 42, and spacecraft, installations illustrated and/or indicated by FIGS. 1 through 5, or in the drawings of vehicle components shown in the background patents. Other uses are for control rods, containers, ducts, panel inserts, torque tubes, etc.

Figure 5:
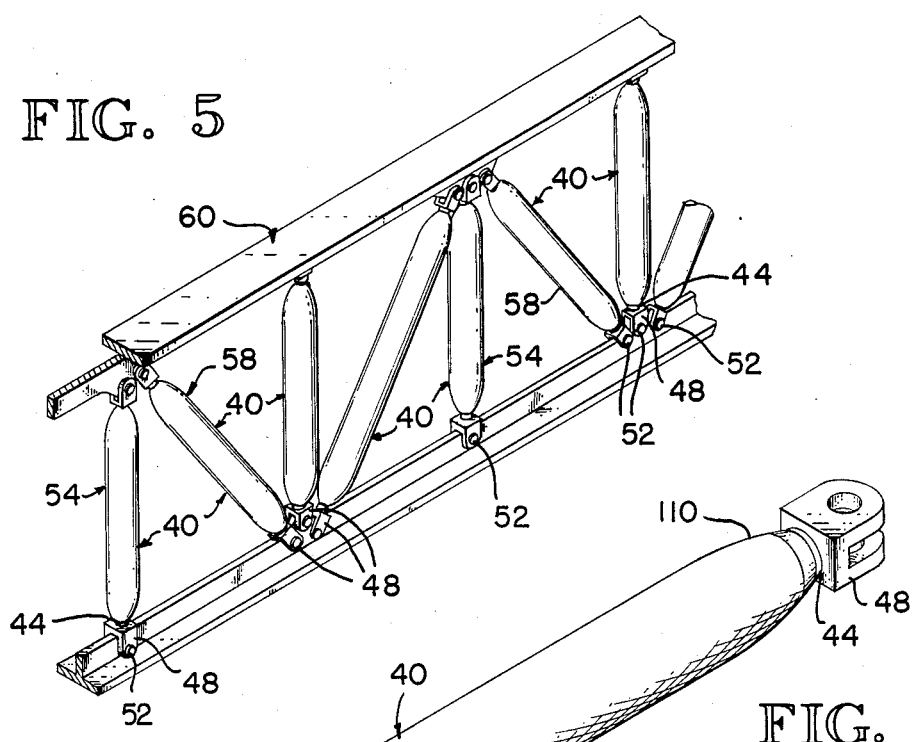
Figure 6:
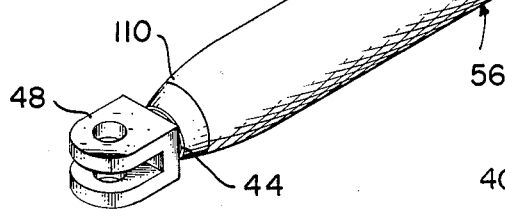
Figure 7:
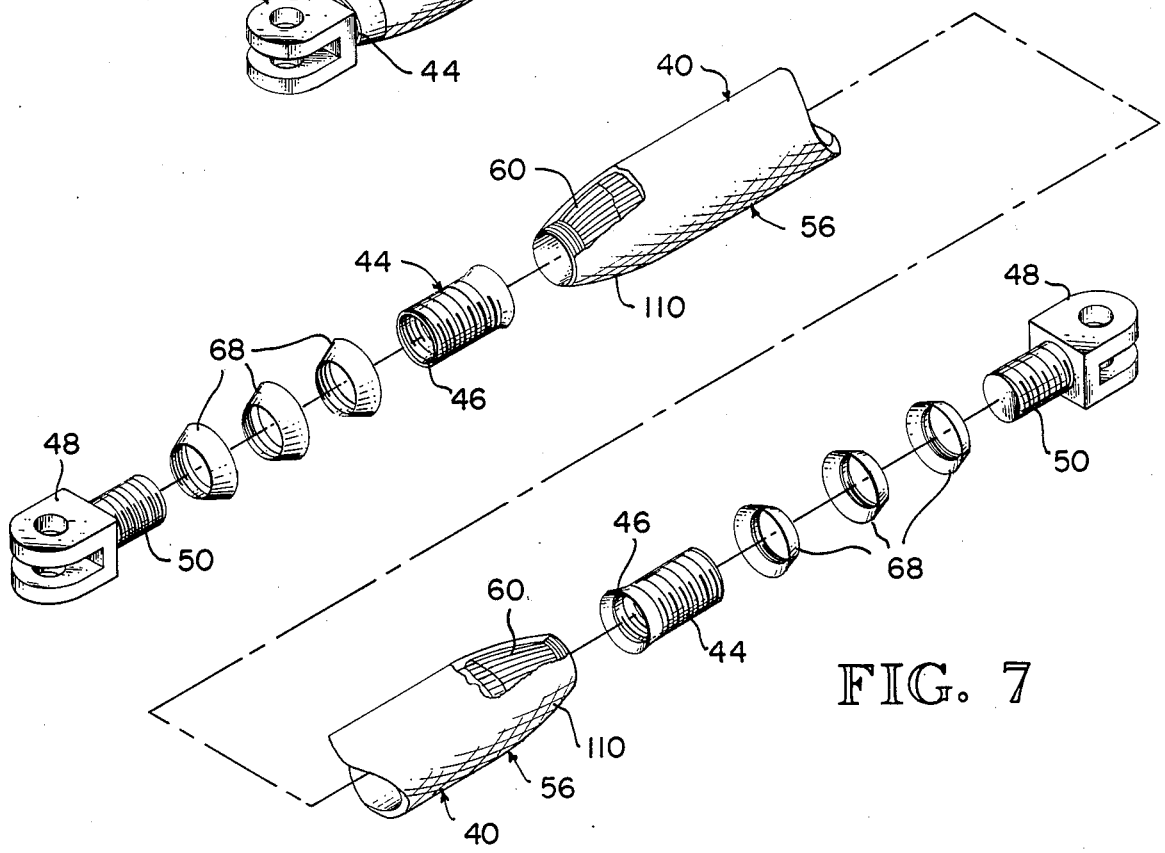

In the drawings, FIG. 1 illustrates an aircraft 42, wherein the considerations of weight reductions have led to the design of hollow continuously wound filament integral structure 40, as shown in FIGS. 6, 7 and 8, having integral end fittings 44, often with inside threads 46, to receive other attachment fittings 48 often specified by the designers of the aircraft 42, having outside threads 50, and fastener receiving couplers 52. The integral structure 40 so equipped with fittings 48 becoming as assembly 54 as shown in FIG. 6, is, for example, designed for use as columns in the overall floor supports 56 illustrated in FIGS. 2, 3 and 4. Also as shown in FIG. 5, some similar but longer assemblies 58 of these integral structures 40 with their added fittings 48 are designed to be installed as diagonal bracing members 58, in overall floor supports 59.

In the exploded view of FIG. 7, with the liberty taken of not unwinding any portions but cutting away some to illustrate the positions of the interleafs 60, the eventual general arrangement of the metal parts is indicated of the key integral components of the hollow continuously wound filament integral structure 40. Their general arrangement is also indicated in FIG. 8, in a partial enlarged cross section, showing the assembled and integrally filament and resin wound positions of the interleafs 60 with their leafs 62, and root wrap 64, the end fitting 44 with its flared end 66, and the outer sleeves 68 with their flared ends 70, also referred to as flared nuts 68. The root warps 64 of the interleafs 60 are positioned between the flared ends 70 of the sleeves 68 or the flared end 66 of the end fitting 44.

As illustrated in FIGS. 7 and 8 the metal parts, i.e. end fittings 44 and sleeves 68 are positioned with respect to the leafs 62 of the interleafs 60, so the longitudinal axis directed loadings, in tension or compression, are fully transmitted between them. Moreover, the root wraps 64 of the interleafs 60 are strong enough and positioned very well to prevent any expansion of any wound filament and resin, which might otherwise allow the unwanted pull out of any sleeve 68 and/or end fitting 44.

Preferred Methods of Making the Interleafs and Related Apparatus.

In FIGS. 9 through 14, preferred methods of making the filament and resin interleafs 60 are illustrated in conjunction with related apparatus. In FIGS. 9 and 10 a rotatable mandrel 72 is shown having two longitudinal slots 74. Adjacent each slot 74 a double back adhesive strip 76 is adhered to the mandrel 72. The rest of the mandrel cylindrical surface is covered by a release film 78. A narrower filament and resin strip 80 to later serve as a root wrap 64 is adhered to the double back adhesive strip 76. Radial pins 82 are positioned on the ends 84 of the mandrel 72 to receive tight circular winds of continuous wider filament and resin strip 86 which later, after cutting to length, serves as leafs 62 of interleafs 60. After its starting securement to the radial pins 82, and upon rotation of the mandrel 72, the castered guide wheel 88 in moving the length of the mandrel 72 distributes the continuous strip 86 in many circular windings, as shown in FIG. 9. The mandrel is also designed as a larger mandrel 90 with more slots 74 and radial pins 82, as shown in FIG. 11.

After the wider filament and resin strip 86 has been fully wound along and on the mandrel 72 or mandrel 90, localized heat is applied by moving a heater roller 92 over the portions of the strip 86 where it makes the numerous contacts with the one or more narrower filament and resin strips 80, thereby creating a bond between them at these crossover locations.

Thereafter spaced longitudinally positioned cuts are made across the wider filament and resin strip 86 by using a blade 93, which is passed along and into the slots 74. Thereafter with or without making any transverse cuts, planar arrangements 94 of the bonded together narrower strips 80 and the wider strips 86 are removed from the mandrels 72 or 90, as shown in FIG. 12.

These planer arrangements 94 are thereafter made into interleafs 60 appearing as grass skirts, as shown in FIG. 14, by using the apparatus illustrated in FIG. 13. Windings of the narrower filament and resin strip 80 of a selected number depending on the overall tailoring design specifications are wound up and down about the rotatable flared mandrel 96. It is driven by an electric motor 98 through a drive system, not shown, positioned in housing 100. The narrower filament and resin strip 80 is guided over a pulley 102 and past a heating element 104 which are both supported on the hand held applicator 106.

The planar arrangement 94 is then turned about the flared mandrel 96 generally making two revolutions. Thereafter additional windings of the narrower filament and resin strip 80 are made. Then another planar arrangement 94 is rotated in place, followed by more windings of strip 80 and an interleaf 60 appearing as a grass skirt is formed, as illustrated in FIG. 14. Tailored designs may call for more planar arrangements 94 and more windings of strip 80 to be made to complete another embodiment of an interleaf 60. For higher production other apparatus is used; however, the basic method of making interleafs is illustrated in these FIGS. 9 through 14.

One Method of Making a Mandrel to be Used in a Filament Winding Machine

Mandrels used in filament winding machines 108, shown in FIG. 20, are made of many materials and in many overall shapes the latter being determined by the product to be manufactured. The hollow continuously wound filament integral structure 40, illustrated in FIGS. 2 through 8, preferably has reduced diameter ends 110, where the windings of the filament and resin are turned around and dwelled during the operations of a filament and resin winding machine 108. One of the lower cost ways of producing a mandrel, which must be reduced in size to be withdrawn out of such reduced diameter ends of filament wound products, is to make a bonded sand mandrel 112, as shown in FIG. 17. It is later soaked in water while inside the product to eliminate the binding from between the grains of sand. Thereafter, the sand may be emptied from within the hollow continuously wound filament integral structure 40.

The forming of the bonded sand mandrel 112 is commenced as 96 parts by weight of sand and 4 parts by weight of sodium silicate solution are mixed and then compacted into place within an assembled split mold 114, as shown in FIG. 15. Throughout its center and extending beyond each end, is a hollow rod 116 with internal threads 118 at each end and with spaced radial orifices 120 throughout its length. The bottom is fitted with a tapered entry liner 122 to form the reduced diameter end 124 of the bonded sand mandrel 112. The compacting of the sand 126 with the solution is undertaken by moving a hollow handle 128, with a partial circular ram 130 attached to its end, up and down the hollow rod 116. When the compacted sand reaches a given level, then after removal of the ram 130, the other reduced diameter end 124 of the bonded sand mandrel 112 is formed by driving down another tapered entry liner 122.

Then carbon dioxide is directed down through the hollow rod 116 and out the orifices 120 in the sand 126. The reaction of the carbon dioxide with the sodium silicate solution bonds the sand grains together. Thereafter, the bonded sand mandrel 112 with its hollow center rod 116 is removed from the split mold 114, in the form shown in FIG. 17, which is to be the form of the interior of the hollow continuously wound filament integral structure 40.

The Assembly of the Mandrel, its Center Rod, Release and Barrier Film, Seals, End Fittings, Chucking Fittings, Interleafs, and Outer Sleeves in Preparing for the Overall Filament and Resin Winding Operations.

In the pre-assembly view of FIG. 18, the respective preplacements are shown of various parts. When they are assembled, with some parts later requiring adjustments during the winding operations, they are then mounted in a filament and resin winding machine 108, as illustrated in figure 20. The parts are: the bonded sand mandrel 112, its hollow center rod 116 with threaded ends 118, a release and barrier film 132 in a tube form, seals 134 and 136, one set of chucking fittings 138, end fittings 44, multiple outer sleeves 68, multiple interleafs 62, and another set of chucking fittings 140. In respect to one end, some of the assembled parts are illustrated in FIG. 19, to show the placement of the seal 134 and the release and barrier film 132, the sand mandrel 112, its hollow center rod 116, the end fitting 44, the chucking fitting 138, and the chucking fitting 140.

The Operation of the Filament and Resin Winding Machine

After the assembly of the parts, as illustrated in FIGS. 18 and 19 is completed, this overall assembly 146 is rotatably and removably secured to a filament and resin winding machine 108, as shown in FIGS. 20, 21, and 22. Four tensioned alike sources 148 of combined filament and resin filaments 159 are arranged on mounting 152 located purposefully at quite a distance from the traveling head 154 of the filament winding machine 108 which supports the various filament pulley guide wheels 156, their pivot support 158, and the filament caster guide wheels 160, which direct the filaments 150 into contact with the revolving mandrel 112 and its accumulating windings of filaments 150.

As indicated schematically in FIG. 22, the traveling head 154 at each location is respectively pivoted to distribute the filament windings so very little of a so called dog bone or piling on effect is created, when the four filaments 150 are being wound on the mandrel 112 at the same winding time. This distribution of the windings and the reduced diameter ends together serve in the manufacture of a strong filament wound integral product having a good appearance, by avoiding the excessive dog bone configuration.

The Traveling Zones of the Winding Operations Along the Length of the Mandrel Revolving in a Filament Winding Machine In FIG. 23A, the initial dwell zone 162 of anchoring circumferential windings in reference to one filament is schematically illustrated. Then as shown in FIG. 23B the traveling head, not shown in the figure, has moved across the mandrel 112 through a translating speed increasing zone called a turnaround zone 164, then on through a constant translating speed zone 166 across the mandrel 112 at a comparatively high speed, and then through a translating speed decreasing zone, again called a turnaround zone 168. As indicated in FIG. 23C, circumferential windings are again undertaken in a dwell zone 170 to anchor the filament windings, before the return travel is undertaken, as indicated in FIG. 23D. During the next sequence of over and back filament windings the angle of winding with respect to the longitudinal axis of the mandrel 112 will be selectively changed. The follow on layers of windings ar kept balanced in the descriptive comparison of the balanced laminations of plywood.

The Placement of the Interleafs in Respect to the Flared Portions of the End Fittings and Outer Sleeves FIG. 24 indicates how the first interleaf 60 at one end is positioned so its root wrap 64 is about the flared end 66 of the end fitting 44. FIG. 25 illustrates how the outer sleeve 68 is moved into position so its flared end 70 covers the root wrap 64 of the first interleaf. The collective leafs 62 of the resulting grouping of interleafs extend through the turnaround zone and beyond to ably transfer the axially directed loads, to be carried to the interleafs by the filament windings wound at smaller angles to the longitudinal axis of the mandrel. The filament windings wound at larger angles are so wound to help position, through bonding and their presence, the other windings wound at smaller angles, so they will not buckle or otherwise move, under axial loads.

Preparation of the Uncured Hollow Continuously Wound Filament Integral Structure With its Mandrel for Curing in an Autoclave After the overall assembly 146 of the parts placed in the filament winding machine 108 is removed from this machine 108, and some chucking fittings are removed, the resulting overall assembly 172 is wrapped using a tube form of a release and barrier film 174 which is sealed by seal 176 at one end, and folded over and held by clamp 178 at the opposite end. Thereafter, as illustrated in FIG. 27, a resilient heat resistant sock 180 is inserted into a vacuum apparatus 182 and expanded to the size of the interior cylinder 184, which has numerous orifices 186 through which the air is withdrawn upon operation of the air impeller 188. With the sock 180 expanded, the wrapped overall assembly 172 is placed inside the sock 180. As the vacuum is reduced and withdrawn the resilient sock 180 tightly surrounds the wrapped and sealed overall assembly 172. Later during the curing operation this sock protects the overall assembly 172 and also helps in forming a better outside appearance of the then cured filament windings. The wrapped, sealed and socked overall assembly 172, is then withdrawn from the vacuum apparatus 182.

Curing of the Uncured Hollow Continuously Wound Filament Integral Structure in its Wrapped, Sealed and Socked Assembly Within an Autoclave The wrapped, sealed, and socked overall assembly 172, while still supported by its center rod 116 of the mandrel 112 and a cover 190 used at the vacuum apparatus 182, is moved to an autoclave 192 and so supported there, as shown in FIG. 28. The autoclave 192 is operated through cycles of temperatures reaching 350° F. and with the pressure reaching 100 p.s.i., in accordance with procedures established by the respective manufacturers of the respective filaments 150, of filament and resin, that are used in the continuous filament winding of the hollow integral structure 40 with integral end fittings 44.

Removal of the Sand Mandrel From the Interior of the Hollow Continuously Wound Filament Integral Structure After the curing of the overall assembly 172 heated in the autoclave 192, this assembly is removed and taken back to the vacuum apparatus 182 to remove the resilient sock 180. Then the release and barrier film 174 is unclamped, unsealed, and removed. Thereafter other chucking fittings are removed leaving the hollow continuously wound filament integral structure 40, its sand mandrel 112, and center rod 116 as the resulting assembly 194. It is then placed in a tubular water bath 196, as illustrated in FIG. 29, and the soaking action effectively removes the binder.

As shown in FIG. 30, with the sand grains being freed of the binder and with the center rod 116 being cleared away, and with the nearly completed product being tilted, the sand leaves the interior space of the hollow continuously wound filament integral structure 40, and its manufacture is completed.

Information Regarding a Specific Sized Embodiment of the Hollow Continuously Wound Filament Integral Structure Which Provided An Ultimate Tensile Load Over Thirty Two Thousand Pounds A hollow continuously wound filament integral structure 40 in a specific sized embodiment provided an ultimate tensile load over thirty two thousand pounds. The integral winding arrangement of all the components was like the arrangement illustrated particularly in FIGS. 7 and 8. At each reduced diameter end 110, two interleafs 60, and three outer sleeves 68, i.e. flared nuts, were installed in conjunction with the flared end fitting 44. The internal diameter was determined by using a mandrel having an outside diameter of 1.875 inches. The wound wall thickness throughout the uniform winding length was 0.054 inches and the overall length was thirty two inches.

All the winding tapes consisted of continuous filaments of graphite impregnated with a high temperature curing resin. In the root wraps 64 of the interleaf 60, graphite resin impregnated tapes of a 6,000 filament count were used having a width of 0.070 inches, and a thickness of 0.005 inches. The theoretical tensile strength attributable only to the graphite filaments was 200,000 pounds per square inch. The maximum resin solid content was 35%, with the minimum being 29%. In the leafs 62 of the interleafs 60, and also in all the tapes wound by the filament winding machine, graphite resin impregnated tapes of a 15,000 filament count were used having a width of 0.128 inches, and a thickness of 0.010 inches. The theoretical tensile strength was also 200,000 pounds per square inch, and the maximum resin solid content was 35%.

In reference to the tailored design of the two interleafs 60 used in this specific sized embodiment of the hollow continuously wound filament integral structure 40, the tensile filament strength of each interleaf 60 at its ninety degree root wraps was 2184 pounds. The derivation of this circumferential tensile load carrying capacity is as follows: 0.070 inches width, times 0.005 inches thickness, times sixteen wraps, i.e. eight wraps in each direction, with three such layers of sixteen wraps, times the 2000,000 pounds per square inch tensile strength, reduced by the 35% for the resin content, i.e. or multiplied by 65% to reflect the graphite filament content. By numerals only: $(0.070 \times 0.005) \times 16 \times 3 \times 200{,}000 \times 0.65 = 2184$ pounds of circumferential strength for one root wrap of one interleaf, or 4368 pounds for two interleafs which were integrally wound into this embodiment. This circumferential tensile strength avoids the pullout of the end fittings 44 by keeping all the filaments in place.

The tensile filament strength of each interleaf 60 in regard to the so called zero degree leafs, which are spaced to be spread out upon installation, was 14,976 pounds. The derivation of this longitudinal tensile load carrying capacity is as follows: 0.128 inches width, times 0.010 inches thickness, times 45 leafs per original planar arrangement 94, times two, for two such arrangements, i.e. two partial skirts, are used in making each interleaf 60, times 200,000 pounds per square inch tensile strength, reduced by the 35% for the resin content, i.e. or multiplied by 65% to reflect the graphite filament content. By numerals only: $(0.128 \times 0.010) \times (45 \times 2) \times 200{,}000 \times 0.65 = 14{,}976$ pounds of longitudinal tensile strength for one interleaf, or 29,952 pounds for the two interleafs which were integrally wound into this embodiment. This longitudinal tensile strength of the two interleafs 60, insures the transmission of the overall axial tensile loading of this embodiment through the turnaround winding zone, which zone, even without interleafs is capable of withstanding over 10,000 pounds of longitudinal tensile forces.

In addition to these tensile strengths, the bonding strengths must be considered, because they must remain great enough to avoid any peel back or other unbonding of the filaments, thereby keeping the tensile loaded filaments in their best load carrying positions in the hollow continuously wound filament integral structure 40. In respect to the resin or matrix adhesion or bond or peel strength of the ninety degree root wraps 64 of the interleafs 60, there are eight adjacent wraps of the narrower tape of graphite filaments and resin, each being 0.070 inches wide and extending about a circumference of a 1.25 inch diameter, and there are a total of four of these eight wide circumferential root wrap areas, because each interleaf has two wound in place planar arrangements, i.e. skirts, and the bond or peel strength is 3500 pounds per square inch. Then by numerals only: $8 \times 0.070 \times 1.25 \times 3.14 \times 4 \times 3500 = 30{,}772$ pounds per interleaf. For the two interleafs the ninety degree total root wrap bond strength is 61,544 pounds.

In respect to the resin or matrix adhesion, or bond, or peel strength of zero degree leafs 62 of the interleafs 60, consideration must be given to the formation of the end windings on the hollow continuously wound filament integral structure 40. During the filament winding machine operations, there is both deceleration and acceleration movements of the carriage, or traveling head, while the mandrel is being rotated at a constant speed, therefore the resulting respective filament paths at the ends of the product being wound go from a desired winding angle of say a selected seven degrees to a winding angle of ninety degrees, and then back to the desired winding angle. This end filament winding surface area at each end is called the turnaround area, which is also described as the dog bone area.

The length of the leafs 62 in their essential zero degree arrangement in respect to the longitudinal axis is $2\frac{1}{2}$ inches and at least the ends nearest the center of the filament wound product, i.e. inboard ends, are in contact with the load carrying filament fibers being wound by the winding machine. It was judged, however, in this tested product 40, that the last inch of these leafs, i.e. the zero degree fibers, were in contact and doing work with the load carrying fibers being wound by the winding machine 108. Therefore a one inch length at a diameter of 1.75 inches times 3.14 or 5.49 square inches, times two surfaces, i.e. inner and outer surfaces, per interleaf, times two interleafs, times 3500 pounds bonding strength per square inch, equals an overall bonding strength of 76,969 pounds at each end. By numerals: 1×1.75×3.14×2×2×3500=76,969 pounds.

During the winding operations on the filament and resin winding machine the layers were wound at the following angles: 7 degrees across and back, referred to as plus and minus 7 degrees; then ±37 degrees; and an interleaf was inserted with an outer sleeve, then back to ±7 degrees; then across and back again at 7 degrees; and another interleaf was inserted with another outer sleeve, then ±37; and then ±7; to complete the filament winding of this specific sized embodiment of the hollow continuously wound filament integral structure. During all these winding times four bands of 6000 filament tape were being laid down at a width totalling 0.289", and a thickness of 0.005".

All the filament tapes could be obtained without the pre-pregnation of the resin, and their pregnation considered as part of the method of making these hollow continuously filament wound integral products. Production runs of all manufacturers, currently are not precisely uniform in respect both to the filament fibers and/or their pre pregnation. Upon delivery, specific specifications are included by the manufacturer. Therefore care must by taken, when practicing this method, to refer to the current specifications, which include the tensile strengths and bonding strengths.

Each manufacturer of filament and resin also furnishes instructions as to an autoclave cure cycle. A typical example is:

1. raise the autoclave temperature from room temperature to 250° F. at 2° to 5° per minute;
2. hold the temperature at 250° F. for 15 minutes;
3. then apply 100 p.s.i., holding at 250° F.;
4. hold at 250° F. and 100 p.s.i. for 45 minutes;
5. raise the temperature to 350° F. at 2° to 5° per minute;
6. hold the temperature at 350° F. for 2 hours; and
7. cool under pressure to below 175° F.

Throughout the curing the heating must be reasonably uniform requiring the circulation of heated air inside the autoclave.

Further Comments Concerning the Interleafs and Resulting Products in Which They are Used Throughout, the preceding description the interleafs of filament and resin were discussed in conjunction with carrying axial loads, via their leafs, through the turnaround zone and on to end fittings generally made of metal, so these loads would not be diminished by the poorer load carrying capacities of the filament and resin tapes being distributed by the filament winding machine in the turnaround zones. These interleafs were also discussed in conjunction with carrying circumferential tension loads, via their root wraps which surrounded the filament and resin tapes being distributed by the filament winding machine, and which also surrounded the end fittings and outer sleeves.

The leafs were referred to as being directed axially or in the zero degree direction to distinguish them as being primarily directed to transferring axial loads. However, as indicated by their manufacture and use, the leafs, which are spaced in their initial skirt portions, when applied in reducing diameter and/or tapering portions, flare out and are not always specifically axially aligned or at a zero degree direction.

Moreover, where torque was to be transmitted rather than axially directed loads, the leafs of the interleafs are laid at selected cross angles to more efficiently carry the torque loads through the turnaround zone.

The interleafs were discussed as being preformed, whereby their root wraps were described as being initially bonded to the leafs in the initial skirt portions. Thereafter, additional root wraps were often made to these skirts of preformed interleafs.

However, it is to be understood these interleafs are also made in situ at the time when the overall winding operation is undertaken. When the mandrel is stopped, selective leafs are specifically laid in place over filament and resin tape windings in the turnaround zone at each end of the mandrel. Their inherent adhesion holds them in place. Then the mandrel is turned as selective root wraps are circumferentially laid in place over the leafs and over portions of the filament and resin tape windings in the turnaround zone at each end of the mandrel.

In addition, these interleafs serve the same useful functions of carrying full loads, either axial or torque loads, without the presence of end fittings and/or outer sleeves. An entire product is manufactured using only filament and resin tapes wound about a mandrel. Again the leafs in their selected directions improve the overall load carrying capacity of all the filament and resin tape windings in the turnaround zone and beyond, and the root wraps improve the circumferential tensile strength keeping all the filament and resin tapes in place in the turnaround zone. Also the overall placement and windings of the filament and resin tapes may be controlled at the turnaround zones, so openings are created to receive components, at a later time, which secure this 100% filament wound product at its place of use.

In respect to all the variations of the method steps to tailor these respective hollow filament wound integral structures, they require just a one time rotational mounting in the winding machine. This advantage has been previously described as requiring just one overall filament and resin winding operation.

I claim:

1. A method of constructing a continuously wound, filament and resin, elongate tubular structure having a metallic end fitting joined to at least one end of the tubular structure including the steps of:
   (a) placing the metallic end fitting at a first end of a mandrel of desired shape;
   (b) winding filaments over said mandrel to form a body of said elongate tubular structure;
   (c) forming, separately from said tubular structure, a skirt of filaments having a first elongate filament and resin strip and including a plurality of second strips of filament and resin adhesively secured to the first elongate filament and resin strip, said second strips substantially to said first elongate filament and resin strip, parallel to one another;
   (d) placing said preformed skirt over said end fitting and mandrel such that said first elongate filament and resin strip overlies at least a portion of said end fitting and said second strips extend from said end fitting over at least a portion of the windings of filament on said mandrel, said second strips being substantially parallel to an elongate dimension of said elongate tubular structure; and
   (e) winding a layer of filaments over the skirt after the skirt is in place on the end fitting and mandrel.

2. The method of claim 1, further including the step of:
   forming the tubular structure to a desired thickness by alternately winding layers of filaments on said mandrel and end fitting and placing said preformed skirts over said layers until predetermined number of filament layers and skirts have been placed on said mandrel and said tubular structure has obtained a desired thickness.

3. The method of claim 2, wherein the elongate tape is bonded to the filament strips by heat bonding.

4. The method of claim 2, wherein said filament strips extend over the entire length of said tubular structure.

* * * * *

UNITED STATES PATENT AND TRADEMARK OFFICE
CERTIFICATE OF CORRECTION

PATENT NO. : 4,851,065

DATED : July 25, 1989

INVENTOR(S) : William C. Curtz

It is certified that error appears in the above-identified patent and that said Letters Patent is hereby corrected as shown below:

| Column | Line | Error |
|--------|------|-------|
| 1 | 38 | delete "source" before "in" |
| 3 | 49 | "rejected" should be --injected-- |
| 6 | 62 | "as" should be --an-- (first occurrence) |
| 7 | 13 | "warps" should be --wraps-- |
| 7 | 63 | "planer" should be --planar-- |
| 9 | 68 | "ar" should be --are-- |
| 11 | 57 | "2000,000" should be --200,000-- |
| 13 | 25 | "by" should be --be-- |
| 13 | 46 | delete the comma (",") after "Throughout" |
| 14 | 53 | add --orthogonal-- after "substantially" |

Signed and Sealed this

Tenth Day of September, 1991

Attest:

HARRY F. MANBECK, JR.

Attesting Officer

Commissioner of Patents and Trademarks